United States Patent
Chi et al.

(10) Patent No.: US 9,837,669 B2
(45) Date of Patent: Dec. 5, 2017

(54) CATALYST LAYER AND MANUFACTURING METHOD THEREOF, MEMBRANE ELECTRODE ASSEMBLY AND MANUFACTURING METHOD THEREOF, AND FUEL CELL USING THE SAME

(71) Applicant: NATIONAL TSING HUA UNIVERSITY, Hsinchu (TW)

(72) Inventors: Yi-Min Chi, Taichung (TW); Tzu-Kang Chin, Hsinchu (TW); Mishra Mrinalini, Hsinchu (TW); Tsong-Pyng Perng, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 42 days.

(21) Appl. No.: 15/203,802

(22) Filed: Jul. 7, 2016

(65) Prior Publication Data

US 2017/0271687 A1   Sep. 21, 2017

(30) Foreign Application Priority Data

Mar. 16, 2016  (TW) .............................. 105108134

(51) Int. Cl.
| | | |
|---|---|---|
| *H01M 4/92* | (2006.01) | |
| *H01M 4/86* | (2006.01) | |
| *H01M 4/88* | (2006.01) | |
| *H01M 8/1004* | (2016.01) | |
| *H01M 8/1007* | (2016.01) | |
| *H01M 8/1018* | (2016.01) | |

(52) U.S. Cl.
CPC ......... *H01M 4/925* (2013.01); *H01M 4/8605* (2013.01); *H01M 4/8657* (2013.01); *H01M 4/8867* (2013.01); *H01M 8/1004* (2013.01); *H01M 8/1007* (2016.02); *H01M 8/1018* (2013.01); *H01M 2008/1095* (2013.01); *H01M 2300/0082* (2013.01)

(58) Field of Classification Search
CPC ............ H01M 8/1018; H01M 8/1007; H01M 4/8657; H01M 4/8605; H01M 4/8867; H01M 8/1004; H01M 2300/0082; H01M 2008/1095; H01M 4/925
See application file for complete search history.

(56) References Cited

U.S. PATENT DOCUMENTS

| | | | | |
|---|---|---|---|---|
| 2011/0151354 A1* | 6/2011 | Jin | ...................... | H01M 4/8842 |
| | | | | 429/489 |
| 2012/0183869 A1* | 7/2012 | Jin | ...................... | H01M 4/8657 |
| | | | | 429/405 |
| 2014/0120454 A1* | 5/2014 | Takahashi | ........... | H01M 4/8832 |
| | | | | 429/482 |

FOREIGN PATENT DOCUMENTS

WO   2011099493 A1   8/2011

* cited by examiner

*Primary Examiner* — Stewart A Fraser
(74) *Attorney, Agent, or Firm* — CKC & Partners Co., Ltd.

(57) ABSTRACT

The present disclosure provides a method for manufacturing a catalyst layer and the method includes the following steps. First, a solution fabrication step is provided for fabricating a solution. The solution includes a solvent, a polymer and a titanium-containing precursor. A layering step is then provided for evaporating the solvent to form a gel-like layer, and a nitridation step is performed for treating the gel-like layer in ammonia ambience to remove the polymer so as to obtain a catalyst support, in which the catalyst support is composed of titanium nitride with a plurality of pores. A catalyst preparation step is performed for forming a plurality of platinum particles on the catalyst support.

20 Claims, 17 Drawing Sheets

(a)

(b)

(c)

(d)

(e)

(f)

US 9,837,669 B2

CATALYST LAYER AND MANUFACTURING METHOD THEREOF, MEMBRANE ELECTRODE ASSEMBLY AND MANUFACTURING METHOD THEREOF, AND FUEL CELL USING THE SAME

RELATED APPLICATIONS

This application claims priority to Taiwan Application Serial Number 105108134, filed Mar. 16, 2016, which is herein incorporated by reference.

BACKGROUND

Technical Field

The present disclosure relates to a method for manufacturing a catalyst layer. More particularly, the present disclosure relates to a method for manufacturing a catalyst layer by using a sol-gel method accompanied with a polymerization-induced phase separation, a catalyst layer, a membrane electrode assembly and a manufacturing method thereof, and a fuel cell using the same.

Description of Related Art

Energy is the source of all economic activity and highly correlates to the development of social economy. To date, most of the energy sources in the world are produced from fossil fuel (such as petrol or gas), hydropower, geothermal energy, nuclear energy and solar energy. The highest ratio is from fossil energy, but burning fossil fuel will produce $CO_2$, $SO_x$ and $NO_x$ pollution. In the past, the abovementioned types of energy were applied broadly for enhancing the economic growth. However, it resulted in terrible air pollution and global warming. Therefore, scientists are eager to look for the solution for reducing the use of the traditional energy. Fuel cells will be one of the most important, potential and practical choices.

The fuel cell is a galvanic cell which converts fuel and gas oxidizing agent to electrical power and produces some products. In other words, the fuel cell converts chemical energy to electrical power directly. Further, the produced waste gas is water vapor, which will not pollute the environment, and it may not need thermal energy to complete the conversion. For this reason, it is one of the clean and high efficiency green energies. Please refer to FIG. 1, which shows a structural schematic diagram of a conventional proton exchange membrane fuel cell unit 100. A proton exchange membrane fuel cell (not shown) includes at least one proton exchange membrane fuel cell unit 100. The proton exchange membrane fuel cell unit 100 includes an anodic bipolar plate 102a, a cathodic bipolar plate 102b, an anodic gas diffusion layer 104a, a cathodic gas diffusion layer 104b, an anodic catalyst layer 106a, a cathodic catalyst layer 106b, a proton exchange membrane 108 and related attachments, such as a blower (now shown), valves (not shown), channels (not shown in the figure) and so on.

Accordingly, the anodic gas diffusion layer 104a, the cathodic gas diffusion layer 104b, the anodic catalyst layer 106a, the cathodic catalyst layer 106b, the proton exchange membrane 108 are the core of the proton exchange membrane fuel cell unit 100 and they are usually combined to form a membrane electrode assembly. The anodic catalyst layer 106a includes an anodic catalyst support 106aa and anodic catalyst 106ab deposited thereon. The cathodic catalyst layer 106b includes a cathodic catalyst support 106ba and cathodic catalyst 106bb deposited thereon. Usually, precious metal particles exhibiting catalyst activity, such as platinum particles, are used as the abovementioned catalysts (106ab and 106bb), and carbon particles are used as the catalyst supports (106aa and 106ba). The platinum particles and the carbon particles are coated, respectively, onto the surface of the anodic gas diffusion layer 104a and the cathodic gas diffusion layer 104b.

However, the usage of the carbon particles as the catalyst supports in the proton exchange membrane fuel cell may produce CO intermediate during the oxidization so as to reduce the efficiency. Even a trace of CO will easily attach on the surface of the platinum particles and reduce the active surface site of the catalyst since CO has a better bonding ability with the platinum particles than hydrogen gas. That is, it is a CO poisoning effect of the catalyst layer in the proton exchange membrane fuel cell. Furthermore, the manufacturing process of using the carbon particles as the catalyst support requires a high thermal energy, which is higher than 1000° C., and the precious metal particles are expensive. All these issues make the proton exchange membrane fuel cell can hardly cost down and are also against the mass production.

SUMMARY

According to one method aspect of the present disclosure, a method for manufacturing a catalyst layer includes a solution fabrication step, a layering step, a nitridation step and a catalyst preparation step. The solution fabrication step is provided for fabricating a solution. The solution includes a solvent, a polymer and a titanium-containing precursor. The layering step is then provided for evaporating the solvent to form a gel-like layer, and the nitridation step is performed for treating the gel-like layer in ammonia ambience to remove the polymer so as to obtain a catalyst support, in which the catalyst support is composed of titanium nitride with a plurality of pores. The catalyst preparation step is performed for forming a plurality of platinum particles on the catalyst support.

According to one structure aspect of the present disclosure, a catalyst layer manufactured by the abovementioned method includes the catalyst support with the pores and the platinum particles. A portion of the pores include a first pore size of 2 nm to 50 nm, and the other portion of the pores include a second pore size greater than 50 nm and less than or equal to 100 nm. The platinum particles are disposed on the catalyst support.

According to another method aspect of the present disclosure, a method for manufacturing a membrane electrode assembly including the following steps is provided. A proton exchange membrane with a first surface and a second surface is provided. An anodic gas diffusion layer, a cathodic gas diffusion layer, an anodic catalyst layer and a cathodic catalyst layer are provided. The anodic catalyst layer is disposed on the anodic gas diffusion layer and located between the first surface of the proton exchange membrane and the anodic gas diffusion layer, and the cathodic catalyst layer is disposed on the cathodic gas diffusion layer and located between the second surface of the proton exchange membrane and the cathodic gas diffusion layer. At least one of the anodic catalyst layer and the cathodic catalyst layer is manufactured by the abovementioned method. Finally, a hot pressing step is provided, in which the anodic gas diffusion layer, the anodic catalyst layer, the proton exchange membrane, the cathodic catalyst layer and the cathodic gas diffusion layer are hot pressed to form the membrane electrode assembly.

According to another structure aspect of the present disclosure, a membrane electrode assembly manufactured by the abovementioned method is provided.

According to further another structure aspect of the present disclosure, a fuel cell including the abovementioned membrane electrode assembly is provided.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
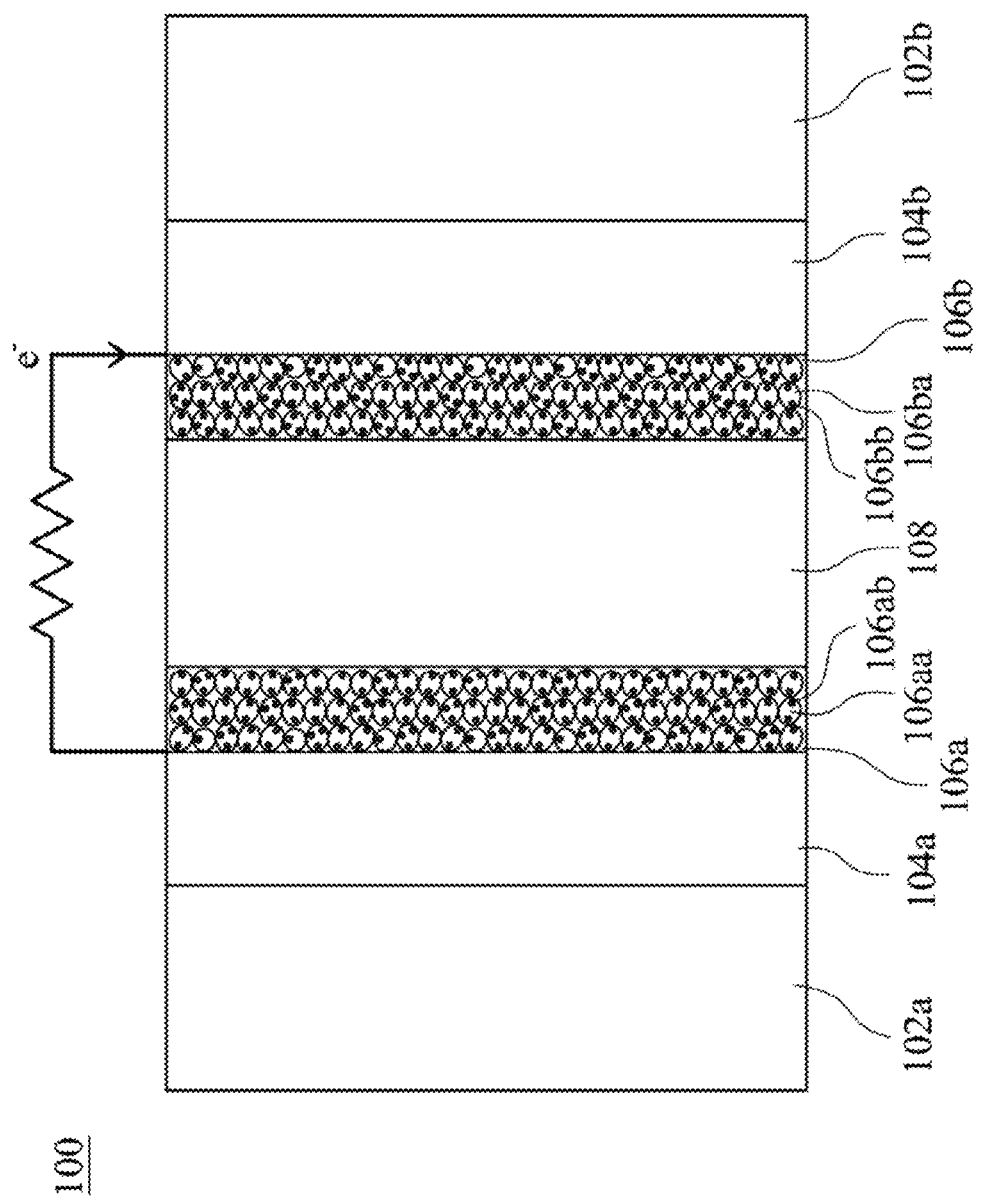
FIG. 1 shows a structural schematic diagram of a conventional proton exchange membrane fuel cell unit.
Figure 2:
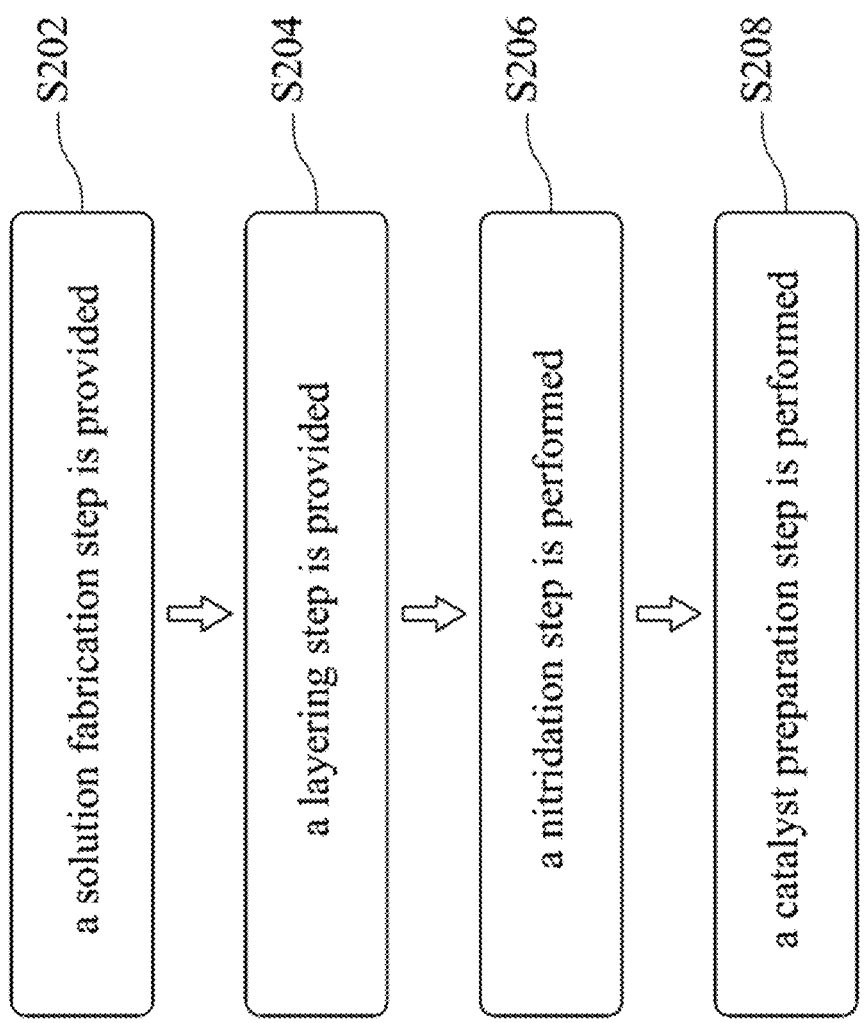
FIG. 2 shows a flow chart of a method for manufacturing a catalyst layer according to a method aspect of the present disclosure.

Please refer to FIG. 2, which shows the flow chart of a method for manufacturing a catalyst layer according to a method aspect of the present disclosure. The method for manufacturing the catalyst layer of the present disclosure includes Step S202, Step S204, Step S206 and Step S208. Each of the abovementioned Steps will be further described as follows.

First, a sol-gel method shown in Step S202 and Step S204 is utilized to fabricate a gel-like layer containing titanium dioxide.

In Step S202, a solution fabrication step is provided. The solution fabrication step is for fabricating a solution which includes a solvent, a polymer and a titanium-containing precursor. For example, the solvent can be N-methyl-2-pyrrolidone (NMP) or ethanol, the titanium-containing precursor can be titanium isopropoxide (TTIP) or titanium butoxide, and the polymer can be polyvinylpyrrolidone (PVP), polyethylene glycol (PEG), polyvinyl alcohol (PVA), polyethylene oxide (PEO), polyacrylic acid (PAA) or poly (ethylene glycol)-poly(propylene glycol)-poly(ethylene glycol) (pluronic P-123). However, the present disclosure is not limited thereto.

In Step S204, a layering step is provided. The layering step is for evaporating the solvent to form the gel-like layer. Specifically, the layering step can be a spin coating step. That is, the abovementioned solution can be coated on a substrate by a spin coating process, and a portion of the solvent is evaporated during the process. In the meanwhile, the titanium-containing precursor of the solution reacts with oxygen to form the gel-like layer containing titanium dioxide. Alternatively, the layering step can be a dip coating process. The selection and the condition of the substrate can be decided upon the following use. For example, the substrate can be a carbon-based gas diffusion layer, such as a carbon paper, a carbon cloth or a carbon nanotube, or a metal-based gas diffusion layer, such as a stainless steel mesh or a titanium mesh. Furthermore, the thickness of the substrate can range from 100 μm to 300 μm. However, the present disclosure is not limited thereto.

In Step S206, a nitridation step is performed. The nitridation step is performed for treating the gel-like layer in ammonia ($NH_3$) ambience to remove the polymer and the remained solvent to obtain a catalyst support. The catalyst support manufactured by the method according to the abovementioned method aspect of the present disclosure is composed of titanium nitride with a plurality of pores. According to an embodiment of the present disclosure, Step S206 is performed to heat the gel-like layer to a temperature higher than or equal to 800° C. and less than or equal to 1000° C. for nitridation. In addition, a portion of the pores include a first pore size of 2 nm to 50 nm and the other of the pores include a second pore size greater than 50 nm and less than or equal to 100 nm. That is, the catalyst support provided in the present disclosure has macropores (the pores having the second pore size) and mesopores (the pores having the first pore size) at the same time. The details of the structure will be further illustrated in the following embodiment, and therefore, there is no further description herein.

Finally, In Step S208, a catalyst preparation step is performed. The catalyst preparation step is performed for forming a plurality of platinum particles on the catalyst support. And further, the catalyst preparation step can be an atomic layer deposition step or a wet chemical reduction step.

If Step S208 is the atomic layer deposition step, the titanium-containing precursor is utilized to react with the surface of the catalyst support in a reactor at first. An inert gas is then utilized to remove the unreacted titanium-containing precursor and by-product, and the substrate temperature of such a step ranges from 200° C. to 300° C. However, the present disclosure is not limited thereto.

Subsequently, a co-reactant is introduced to react with the titanium-containing precursors and then the inert gas is purged into the reactor to remove the unreacted precursor and by-product again. The above process is called as a cycle, and each cycle only forms a thin film having a thickness of an atomic layer. Accordingly, Step S208 can be further repeated according to the abovementioned method for controlling the particle size and loading amount of the platinum particles on the catalyst support via the cycle number of the atomic layer deposition step.

The method for manufacturing the catalyst layer provided in the present disclosure has been described as mentioned above. In the following, Embodiments 1 through 8 will be further provided to illustrate the abovementioned method and the membrane electrode assembly using the same in details. The performance of the membrane electrode assembly and the fuel cell including the same are also disclosed therein, but the present disclosure is not limited thereto.

Embodiment 1

In Embodiment 1, the method for manufacturing the catalyst layer provided in the present disclosure will be described accompanied with FIG. 2.

As shown in Step S202 of FIG. 2, the solution comprising the solvent, the polymer and the titanium-containing precursor is prepared at first. The solvent can be N-methyl-2-pyrrolidone (purchased from ECHO), the polymer can be polyvinylpyrrolidone (purchased from Aldrich, molecular weight=29000), and the titanium-containing precursor can be titanium isopropoxide. In Embodiment 1, the amount of the polymer is 50 wt % of that of the titanium-containing precursor. The amount of the solvent is fixed at twice of that of the titanium-containing precursor, but the present disclosure is not limited thereto.

As shown in Step S204, a carbon paper (SIGRACT® GDL 24 BC) is then chosen as a substrate to allow the solution to be spin coated uniformly thereon at 600 rpm. During the spin coating process, some solvent will be evaporated into air and the titanium-containing precursor reacts with oxygen to form titanium dioxide. At that time, the solution turns into a white gel-like thin film on the carbon paper.

As shown in Step S206, it is followed by direct heating the gel-like layer, which is formed on the carbon paper as mentioned above, in ammonia ambience to a temperature higher than or equal to 800° C. and less than or equal to 1000° C. with a heating rate of 20° C./min to remove the polymer and the remained solvent. Moreover, Step S206 is held for 1 to 2 hours. After Step S206, the nitridated gel-like layer on the carbon paper is cooled down in a continuous flow of $NH_3$ gas to obtain the catalyst support. A scanning electron microscopy and a BET TriStar 3000 gas adsorption analyzer with $N_2$ physisorption then determine the structure and the specific surface area of the catalyst support.

In Embodiment 1, Step S208 is performed by the atomic layer deposition process. And further, the platinum precursor and the co-reactant of Step S208 are (methylcyclopentadienyl)trimethyl platinum (IV) ($MeCpPtMe_3$) and oxygen ($O_2$), respectively. The temperature of the catalyst support during the process is kept at 280° C. In addition, the chamber is evacuated to 1 torr and 5 torr under continuous flow of $O_2$ and $N_2$ atmosphere, respectively. The catalyst support is alternatively exposed to the precursor of $MeCpPtMe_3$ with 0.5 s pulse time and $O_2$ with 2 s pulse time. Finally, the lengths of purge time by $N_2$ is 15 s and 20 s for $MeCpPtMe_3$ pulse and $O_2$ pulse, respectively. However, the present disclosure is not limited thereto. Furthermore, it is noted that Step S208 is repeated for 100 times in Embodiment 1.

Comparative Embodiment 1

Comparative embodiment 1 is similar to Embodiment 1, except that the solution for manufacturing the catalyst support is prepared without the polymer. That is, the amount of the polymer in the solution is 0 wt %.

Comparative Embodiment 2

A commercial E-Tek (ELAT® GDE LT 120E-W) is utilized as a catalyst in Comparative embodiment 2, and the loading amount of the platinum particles on the commercial E-Tek is 500 $mg/cm^2$.

Embodiments 2-7

Embodiments 2 through 5 are similar to Embodiment 1, except that the concentration of the polymer in the solution for manufacturing the catalyst support will be adjusted so as to change the specific surface area and the pore size of the catalyst support. Embodiments 6 through 7 are also similar to Embodiment 1, except that the cycle number of Step S208 will be further adjusted so as to change the particle size of the platinum particles and the loading amount of that on the catalyst support. The main conditions for manufacturing the catalyst layer in Embodiments 2 through 7 are listed as the following Table 1.

TABLE 1

| | Solvent | Titanium-containing precursor | Polymer | Concentration of polymer (wt %) | Cycle number of Step S208 |
|---|---|---|---|---|---|
| Embodiment 1 | NMP | TTIP | PVP | 50 | 100 |
| Embodiment 2 | | | | 40 | 100 |
| Embodiment 3 | | | | 30 | 100 |
| Embodiment 4 | | | | 20 | 100 |
| Embodiment 5 | | | | 10 | 100 |
| Embodiment 6 | | | | 50 | 50 |
| Embodiment 7 | | | | 50 | 200 |

Figure 3A:
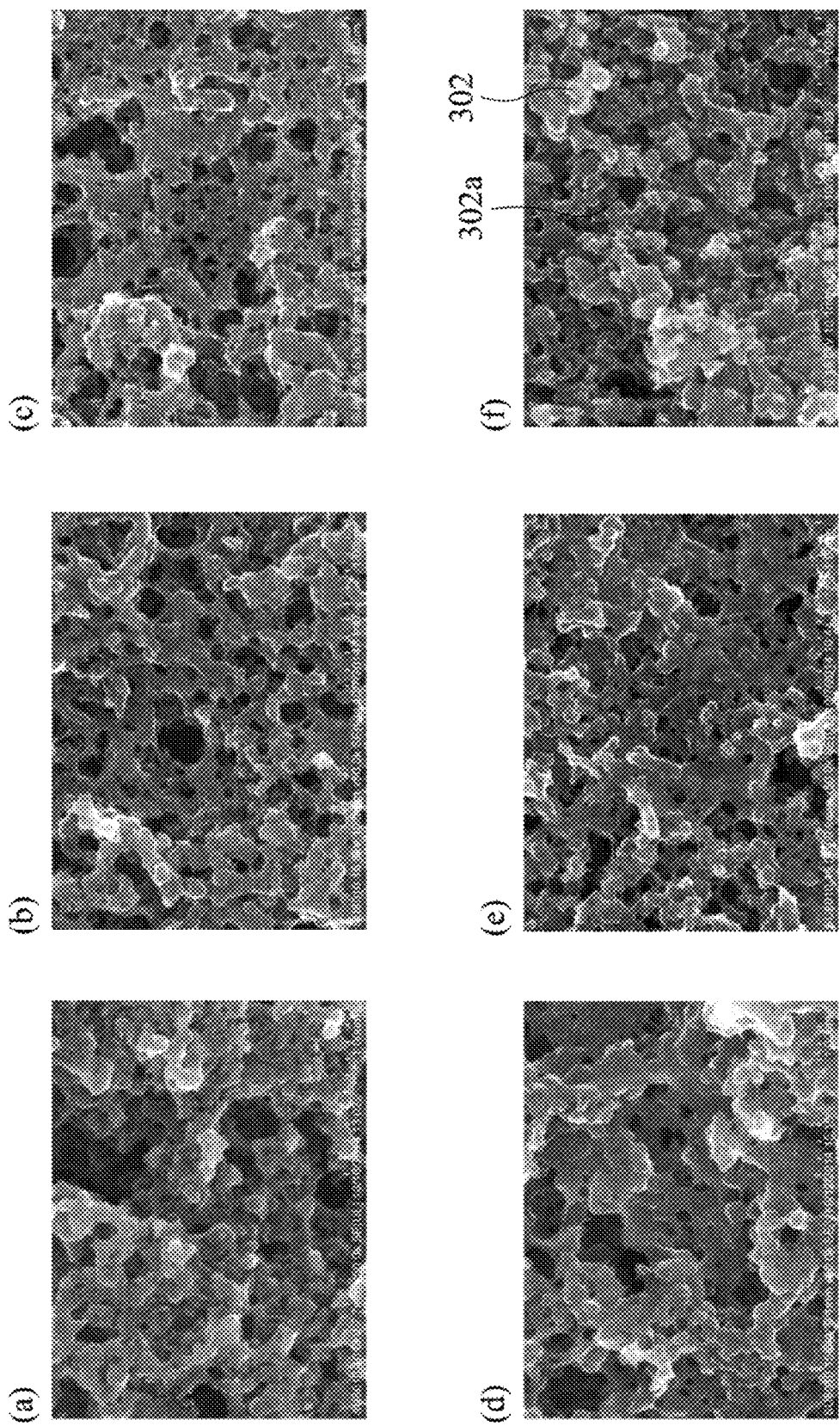
FIG. 3A and FIG. 3B show scanning electron microscopic images of a catalyst support of a catalyst layer under various magnifications according to a structure aspect of the present disclosure.
Figure 3B:
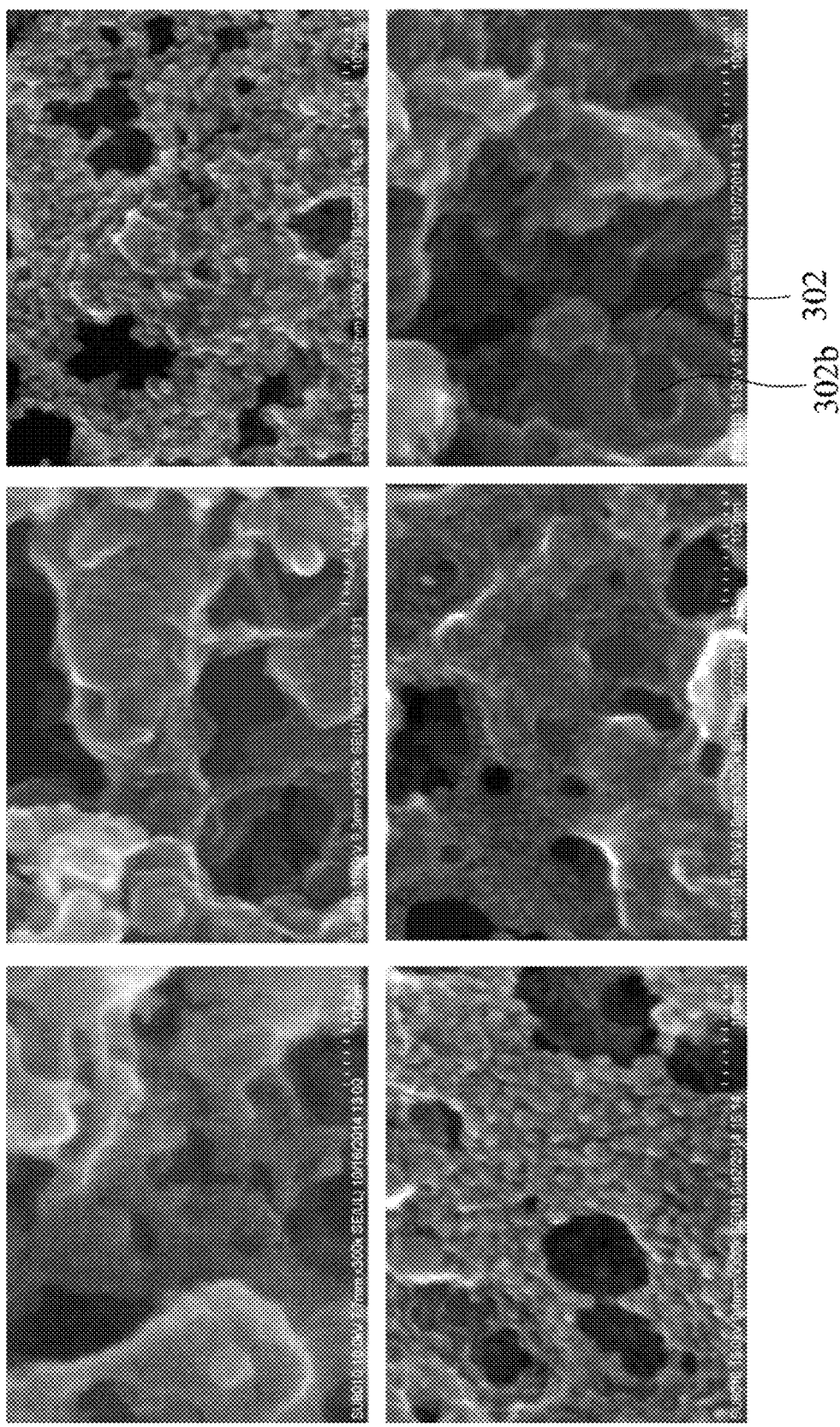
Figure 3C:
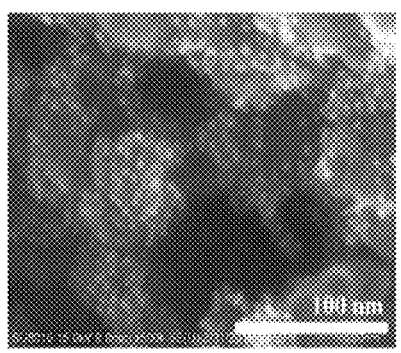
FIG. 3C shows scanning electron microscopic images of a catalyst layer and corresponding particle size distributions of platinum particles according to a structure aspect of the present disclosure.
Figure 3C:
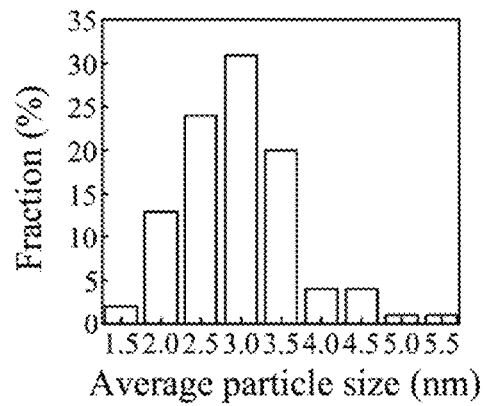
Figure 3C:
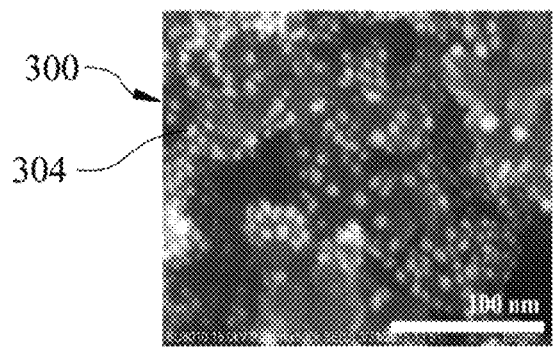
Figure 3C:
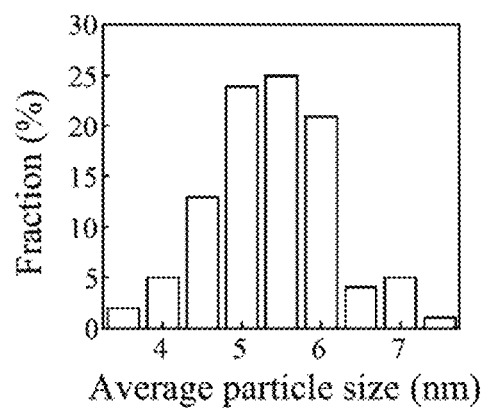
Figure 3C:
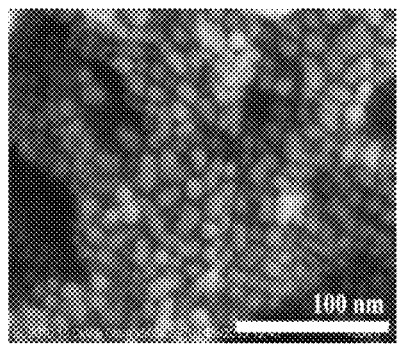
Figure 3C:
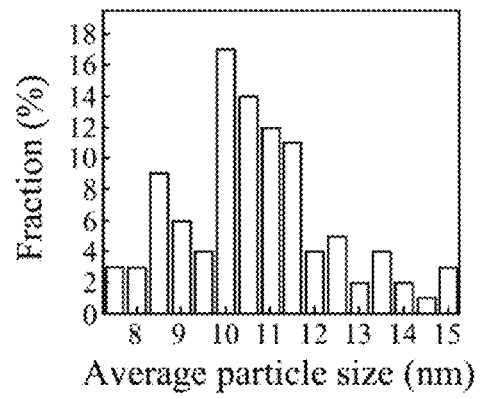

Please refer to FIG. 3A, FIG. 3B and FIG. 3C. FIG. 3A and FIG. 3B show scanning electron microscopic images of catalyst supports 302 of catalyst layers 300 (please refer to FIG. 3C) under various magnifications according to Embodiments 1 through 7 of the present disclosure. FIG. 3C shows scanning electron microscopic images of catalyst layers 300 and the corresponding particle size distributions of platinum particles according to Embodiments 1, 6 and 7 of the present disclosure.

The symbols (a), (b), (c), (d), (e) and (f) shown in FIG. 3A and FIG. 3B represent the scanning electron microscopic images of the catalyst supports 302 in Comparative embodiment 1 and Embodiments 5 through 1, respectively. Based on (a) through (f) of FIG. 3A, the catalyst support 302 manufactured by the abovementioned method aspect of the present disclosure is an interconnected porous structure with a plurality of first pores 302a. The first pores 302a have a first pore size which is negatively proportional to the concentration of the polymer in the solution. That is, the thicker the concentration of the polymer of the solution is, the smaller the first pores 302a are. Based on FIG. 3B, it is further noted that the backbone of the catalyst support 302 is composed of an aggregation of a plurality of particles, and there are a plurality of second pores 302b with a second pore size among the particles. According to an embodiment of the present disclosure, the first pore size and the second pore size are both determined by scanning electron microscopy. The first pore size ranges from 2 nm to 50 nm, and the second pore size is greater than or equal to 50 nm and less than or equal to 100 nm.

In addition, the specific surface area of the catalyst support 302 in Comparative embodiment 1 and Embodiments 5 through 1 are 31.41, 81.03, 101.40, 120.84, 123.74 and 167.80 $m^2/g$, respectively. Therefore, the specific surface area is positively proportional to the concentration of the polymer in the solution.

Moreover, FIG. 3C (a) and (b) represent the scanning electron microscopic images of the catalyst layer 300 and the particle size distribution of the platinum particles in Embodiment 6, respectively. FIG. 3C (c) and (d) represent the scanning electron microscopic images of the catalyst layer 300 and the particle size distribution of the platinum particles in Embodiment 1, respectively. FIG. 3C (e) and (f) represent the scanning electron microscopic images of the catalyst layer 300 and the particle size distribution of the platinum particles in Embodiment 7, respectively. Based on (a) and (b), (c) and (d), and (e) and (f) of FIG. 3C, the average particle sizes of the platinum particles 304 are 2.95 nm, 5.38 nm and 10.73 nm, respectively, when the cycle numbers of Step S208 are 50, 100 and 200, respectively. That is, the particle size of the platinum particles 304 is linearly proportional to the cycle number of Step S208.

The loading amount of the platinum particles 304 on the catalyst support 302 is then measured by an inductively coupled plasma mass spectrometer (ICP-MS). The loading amount of the platinum particles 304 on the catalyst support 302 in Embodiments 6, 1 and 7 are 0.009, 0.017 and 0.039 $mg/cm^2$, respectively. That is, the loading amount of the platinum particles 304 on the catalyst support 302 is linearly proportional to the cycle number of Step S208. The method for measuring the loading amount of the platinum particles 304 on the catalyst support 302 by inductively coupled plasma mass spectrometry is well-known for the people in the art, and therefore, it will not be further described herein.

Embodiment 8

Figure 4:
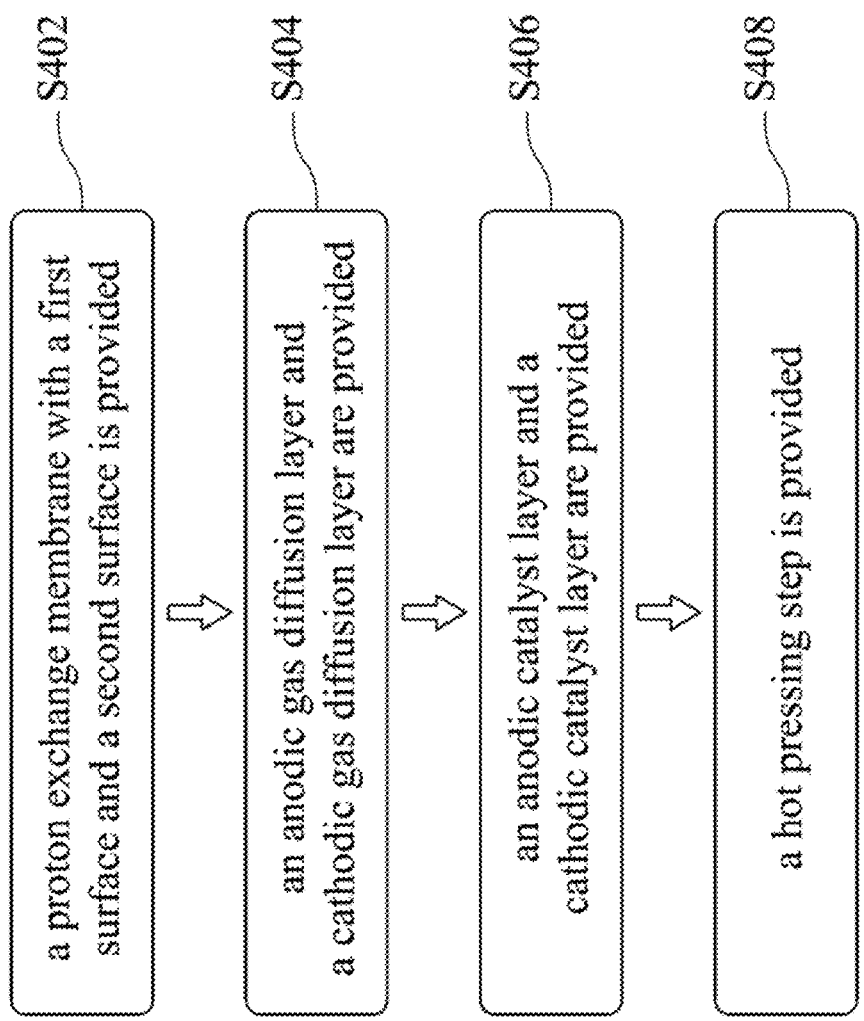
FIG. 4 shows a flow chart of a method for manufacturing a membrane electrode assembly according to another method aspect of the present disclosure.

Please refer to FIG. 4 which shows the flow chart of a method for manufacturing a membrane electrode assembly according to another method aspect of the present disclosure. The method for manufacturing the membrane electrode assembly of the present disclosure includes Step S402, Step S404, Step S406 and Step S408, and each of the abovementioned Steps will be further described as follows.

In Step S402, a proton exchange membrane with a first surface and a second surface is provided. The first surface and the second surface are opposite to each other. In Embodiment 8, a Nafion® 115 membrane with a thickness of 127 μm is used as the proton exchange membrane. The proton exchange membrane is cleaned with 5 wt % $H_2O_2$ at 80° C. for 1 hour to remove organic impurities and small molecule contaminants which might block the ion conduction channels.

In Step S404, an anodic gas diffusion layer and a cathodic gas diffusion layer are provided. The anodic gas diffusion layer and the cathodic gas diffusion layer can be carbon paper (SIGRACT® GDL 24 BC), however, the present disclosure is not limited thereto. That is, the anodic gas diffusion layer and the cathodic gas diffusion layer also can be carbon cloth or other materials.

In Step S406, an anodic catalyst layer and a cathodic catalyst layer are provided. The anodic catalyst layer is deposited on the anodic gas diffusion layer and located between the first surface of the proton exchange membrane and the anodic gas diffusion layer. The cathodic catalyst layer is deposited on the cathodic gas diffusion layer and located between the second surface of the proton exchange membrane and the cathodic gas diffusion layer. That is, the anodic catalyst layer and the cathodic catalyst layer provided in Step S404 is the substrate where the gel-like layer is formed thereon according to Embodiment 1.

In details, the anodic catalyst layer and the cathodic catalyst layer provided in Step S406 are manufactured according to the abovementioned method of the present disclosure, that is, Steps S202 through S208. Therefore, there is no further description herein. According to an embodiment of the present disclosure, the anodic catalyst layer of the membrane electrode assembly is manufactured by the abovementioned method but the cathodic catalyst layer is the commercial catalyst of Comparative embodiment 2. Furthermore, according to another embodiment of the present disclosure, the cathodic catalyst layer of the membrane electrode assembly is manufactured by the abovementioned method but the anodic catalyst layer is the commercial catalyst of Comparative embodiment 2. More particularly, according to further another embodiment of the present disclosure, the anodic catalyst layer and the cathodic catalyst layer of the membrane electrode assembly are both manufactured by the abovementioned method.

In Step S408, a hot pressing step is provided, in which the anodic gas diffusion layer, the anodic catalyst layer, the proton exchange membrane, the cathodic catalyst layer and the cathodic gas diffusion layer are hot pressed to form the membrane electrode assembly. In Embodiment 8, Step S408 is conducted under a pressure of 600 psi at 140° C. for 90 s.

Performance Test of Membrane Electrode Assembly

The performance of the catalyst layer, which is manufactured by the method of the present disclosure, and the membrane electrode assembly using the same will be further illustrated as follows.

Figure 5:
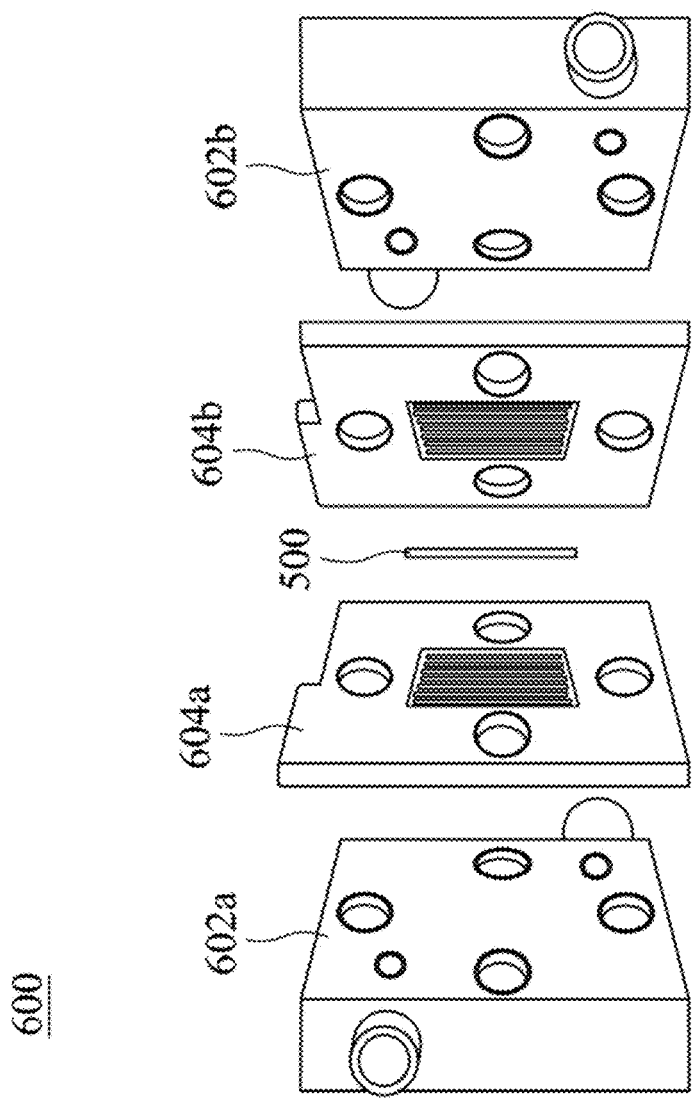
FIG. 5 shows a schematic diagram of a single cell test station of a proton exchange membrane fuel cell.

Please refer to FIG. 5 which shows a schematic diagram of a single cell test unit 600 of a proton exchange membrane fuel cell. The single cell test unit 600 includes an end plate 602a and a graphitic flow channel 604a located at the anode, and an end plate 602b and a graphitic flow channel 604b located at the cathode. The membrane electrode assembly to be tested is placed in the middle of the graphitic flow channel 604a and graphitic flow channel 604b.

The single cell test unit 600 is then assembled onto a single cell testing system of the proton exchange membrane fuel cell (PEMSCT-150, purchased from JNP Tech Co.) consisting of a DC electronic load (Angilent N3302A), two mass flow controllers (Brooks 5850 E series), a temperature controller, and two water reservoirs although not shown in the figure. In details, the fuel gases used in the single cell testing system of the proton exchange membrane fuel cell are $H_2$ and $O_2$. The mass flow controllers are used to control the flow rates of $H_2$ and $O_2$. The temperature controllers are used to keep the temperatures of the water reservoirs and the single cell test unit at desirable values. As for other test conditions, for example, the membrane electrode assembly can be tested under the control of a computer, at 60° C. from 1V to 0.5 V with 50 sccm of both $H_2$ and $O_2$. It is noted that the single test unit 600 and the single cell testing system of the proton exchange membrane fuel cell are only used to test the performance of the membrane electrode assembly 500 provided in the present disclosure and not the main features herein. Therefore, the structure and the operation thereof will not be further described herein.

Figure 6A:
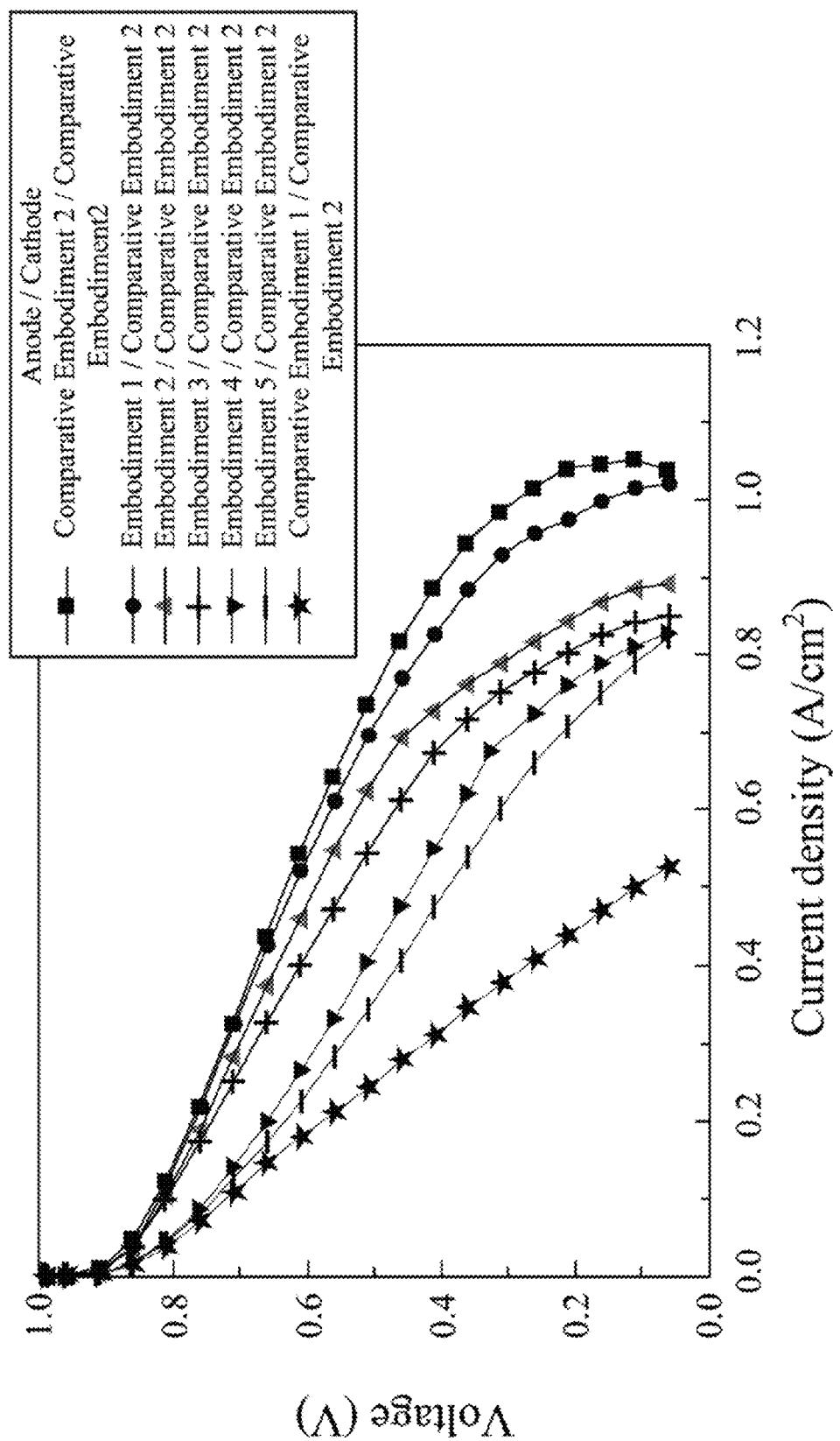
FIG. 6A shows discharge curves of current density vs. voltage of membrane electrode assemblies using catalyst layers in Embodiments 1 through 5 and Comparative embodiments 1 and 2.
Figure 6B:
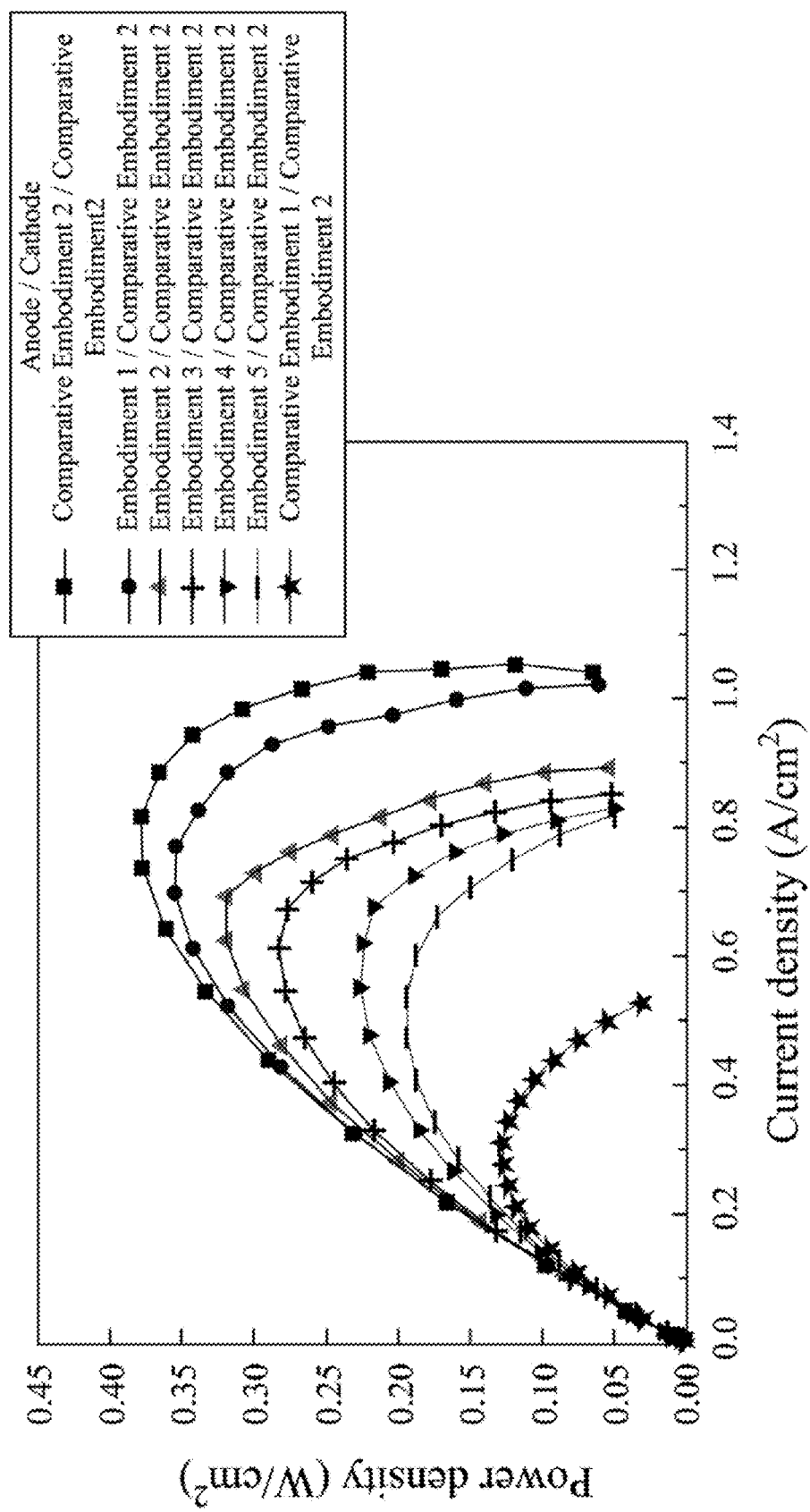
FIG. 6B shows the discharge curves of current density vs. power density corresponding to FIG. 6A.

Please refer to FIG. 6A and FIG. 6B. FIG. 6A shows discharge curves of current density vs. voltage of membrane electrode assemblies using catalyst layers in Embodiments 1 through 5 and Comparative embodiments 1 and 2. FIG. 60 shows the discharge curves of current density vs. power density corresponding to FIG. 6A. In particular, FIG. 6A shows the discharge curves of the current density vs. the voltage of the membrane electrode assemblies that use the catalyst layers of Comparative embodiments 1 and 2, and Embodiments 1 through 5 as the anode and the commercial catalyst of Comparative embodiment 2 as the cathode.

Based on FIG. 6A and FIG. 6B, the performance of the membrane electrode assembly is positively proportional to the concentration of the polymer of the solution, which is used for manufacturing the catalyst support, when the anode of the membrane electrode assembly is one of the catalyst layers of Comparative embodiment 1 and Embodiments 1 through 5. That is, the higher the specific surface area of the catalyst support and the loading amount of the platinum particles are, the higher the performance of the membrane electrode assembly is.

Accordingly, the catalyst support, which is manufactured by the method for manufacturing the catalyst layer according to the method aspect of the present disclosure, is a macro/mesoporous structure so as to effectively improve the performance of the membrane electrode assembly and the fuel cell using the same.

In addition, based on the discharge curves of the current density, voltage and power density shown in FIG. 6A and FIG. 6B, the performance of the membrane electrode assembly using the catalyst layer of Embodiment 1 as the anode is slightly lower than but close to that of the membrane electrode assembly using two commercial catalysts of Comparative embodiment 2 as the anode and the cathode. Their performance data of FIG. 6A and FIG. 6B are compared in Table 2. Therefore, it is seen that a specific power density of the anode of the membrane electrode assembly at 0.6 V (represented by $P_{sA}@0.6V$ in Table 2) can be obtained by dividing the power density of the membrane electrode assembly at 0.6V (represented by $P_{MEA}@0.6V$ in Table 2) with the amount of the platinum particles on the anode of the membrane electrode assembly.

The loading amount of the platinum particles on the catalyst support of the catalyst layer in Embodiment 1 is the highest, that is, 0.017 mg/cm², and it is much lower than the loading amount of the platinum particles on the commercial catalyst in Comparative embodiment 2. The specific power density of the catalyst layer of Embodiment 1 at 0.6 V (that is, 18.706 W/mg) can be obtained by dividing the power density of the membrane electrode assembly (that is, 0.318 mW/cm²) with the amount of the platinum particles on the catalyst layer of Embodiment 1 (that is, 0.017 mg/cm²). Similarly, the specific power density of the commercial catalyst of Comparative embodiment 2, which is used as the anode, at 0.6 V can be obtained according to the abovementioned method and is 0.668 W/mg.

Accordingly, it is seen that the specific power density of the catalyst layer provided in Embodiment 1 of the present disclosure, which is used as the anode of the membrane electrode assembly, is 27 times higher than that of the commercial catalyst of Comparative embodiment 2 even the loading amount of the platinum particles is lower.

TABLE 2

| Electrode | | $P_{MEA}@0.6$ V (W/cm²) | Loading amount of Platinum particles (mg/cm²) | | $P_{sA}@0.6$ V (W/mg) |
|---|---|---|---|---|---|
| anode | cathode | | anode | cathode | |
| Comparative embodiment 2 | Comparative embodiment 2 | 0.334 | 0.5 | 0.5 | 0.668 |
| Embodiment 1 | Comparative embodiment 2 | 0.318 | 0.017 | 0.5 | 18.706 |

Figure 7A:
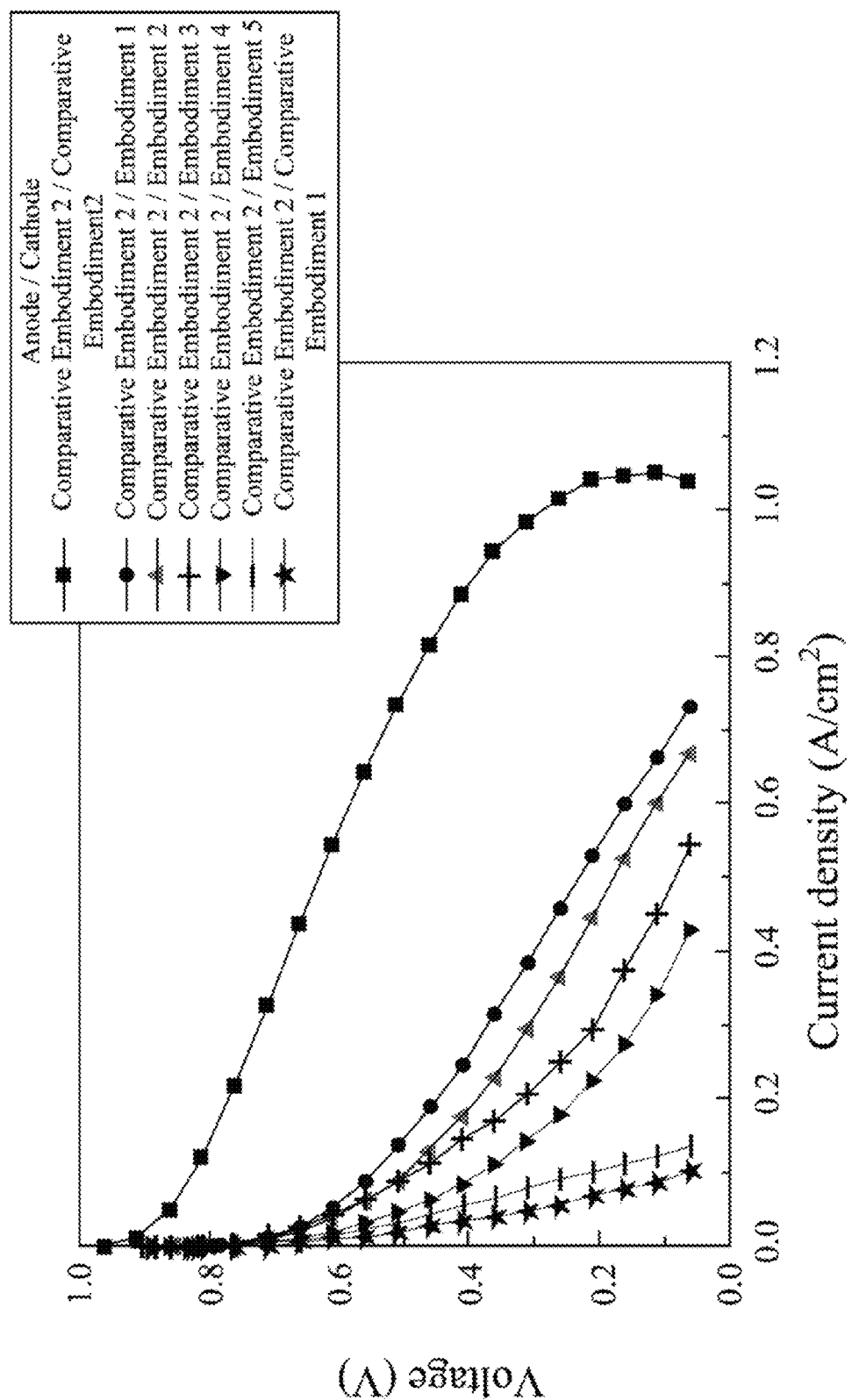
FIG. 7A shows other discharge curves of current density vs. voltage of membrane electrode assemblies using catalyst layers in Embodiments 1 through 5 and Comparative embodiments 1 and 2.
Figure 7B:
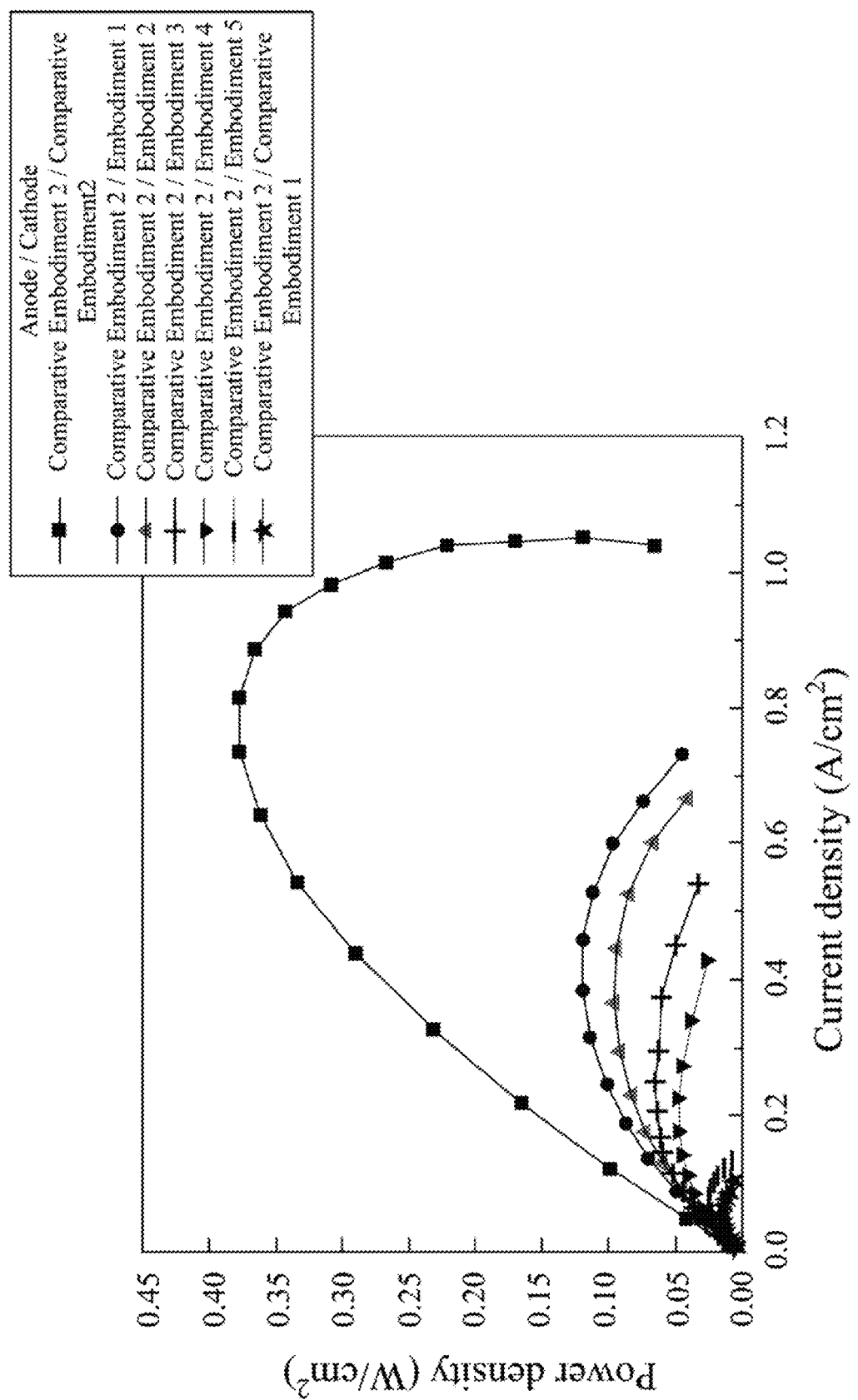
FIG. 7B shows other discharge curves of current density vs. power density corresponding to FIG. 7A.

Please refer to FIG. 7A and FIG. 7B. FIG. 7A shows other discharge curves of current density vs. voltage of membrane electrode assemblies using catalyst layers in Embodiments 1 through 5 and Comparative embodiments 1 and 2. FIG. 7B shows other discharge curves of current density vs. power density corresponding to FIG. 7A. In particular, FIG. 7A shows the discharge curves of the current density vs. the voltage of the membrane electrode assemblies that use the catalyst layers of Comparative embodiments 1 and 2, and Embodiments 1 through 5 as the cathode and the commercial catalyst of Comparative embodiment 2 as the anode.

Based on FIG. 7A and FIG. 7B, the performance of the membrane electrode assembly is positively proportional to the concentration of the polymer of the solution, which is used for manufacturing the catalyst support, when the cathode of the membrane electrode assembly is one of the catalyst layers of Comparative embodiment 1 and Embodiments 1 through 5. That is, the higher the specific surface area of the catalyst support and the loading amount of the platinum particles are, the higher the performance of the membrane electrode assembly is.

In addition, the performance of the membrane electrode assembly using the catalyst layer of Embodiment 1 as the cathode is lower than that of the membrane electrode assembly using two commercial catalysts of Comparative embodiment 2 as the anode and the cathode. The performance data of FIG. 7A and FIG. 7B are compared in Table 3. It is seen that the specific power density of the catalyst layer of Embodiment 1 at 0.6 V, which Is represented by $P_{sC}@0.6V$ in Table 3 and is 1.882 W/mg, can be obtained by dividing the power density of the membrane electrode assembly (that is, 0.032 mW/cm²) with the amount of the platinum particles on the catalyst layer of Embodiment 1 (that is, 0.017 mg/cm²). Similarly, the specific power density of the commercial catalyst of Comparative embodiment 2, which is used as the cathode, at 0.6 V can be obtained according to the abovementioned method and is 0.668 W/mg.

Accordingly, it is seen that the loading amount of the platinum particles of the catalyst layer provided in Embodiment 1 of the present disclosure is lower. However, the specific power density of the abovementioned catalyst layer, which is used as the cathode of the membrane electrode assembly, is 3 times higher than that of the commercial catalyst of Comparative embodiment 2.

TABLE 3

| Electrode | | $P_{MEA}$@0.6 V (W/cm$^2$) | Loading amount of Platinum particles (mg/cm$^2$) | | $P_{sC}$@0.6 V (W/mg) |
|---|---|---|---|---|---|
| anode | cathode | | anode | cathode | |
| Comparative embodiment 2 | Comparative embodiment 2 | 0.334 | 0.5 | 0.5 | 0.668 |
| Comparative embodiment 2 | Embodiment 1 | 0.032 | 0.5 | 0.017 | 1.882 |

Figure 8A:
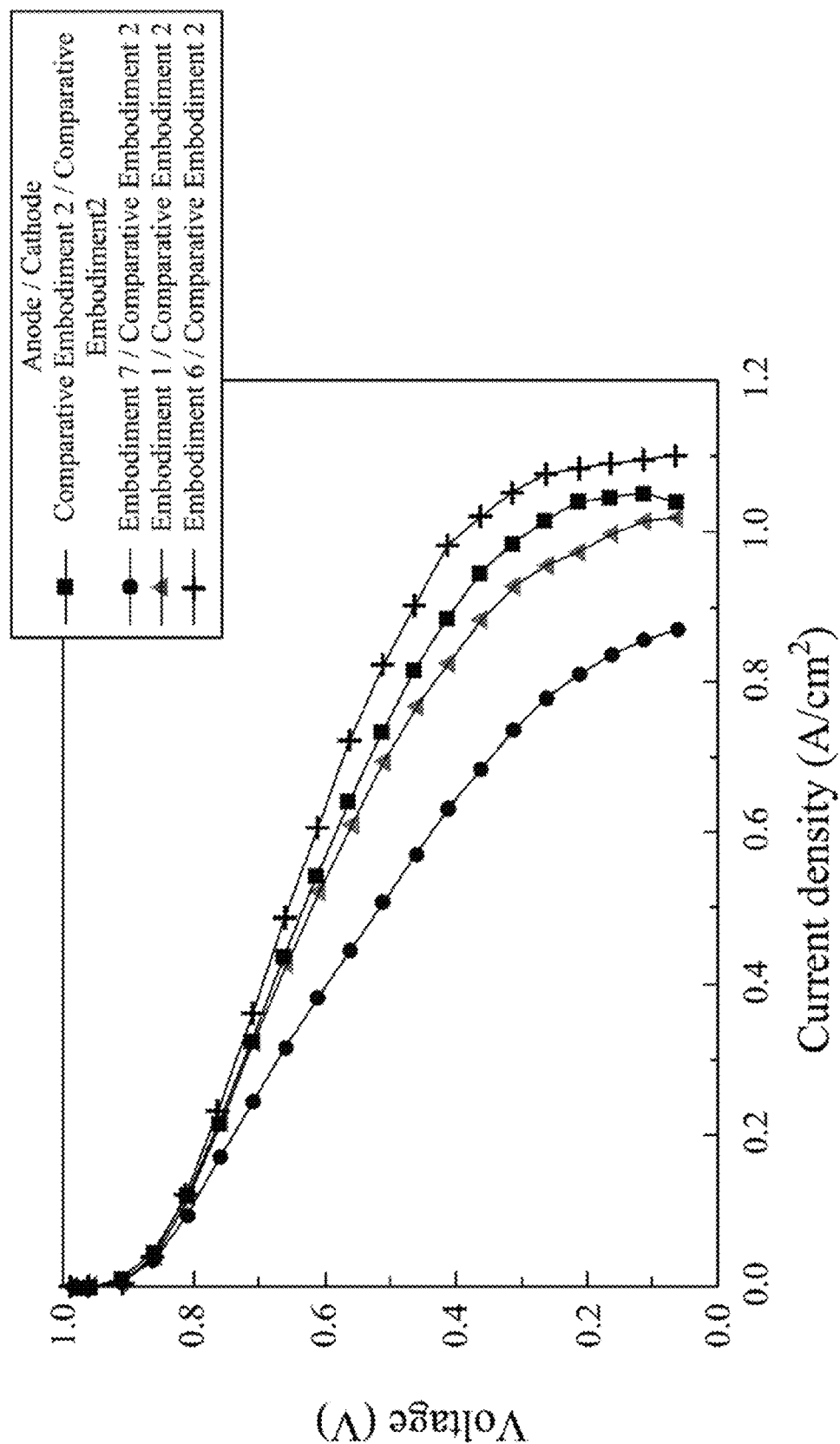
FIG. 8A shows discharge curves of current density vs. voltage of membrane electrode assemblies using catalyst layers in Embodiments 1, 6 and 7 and Comparative embodiment 2.
Figure 8B:
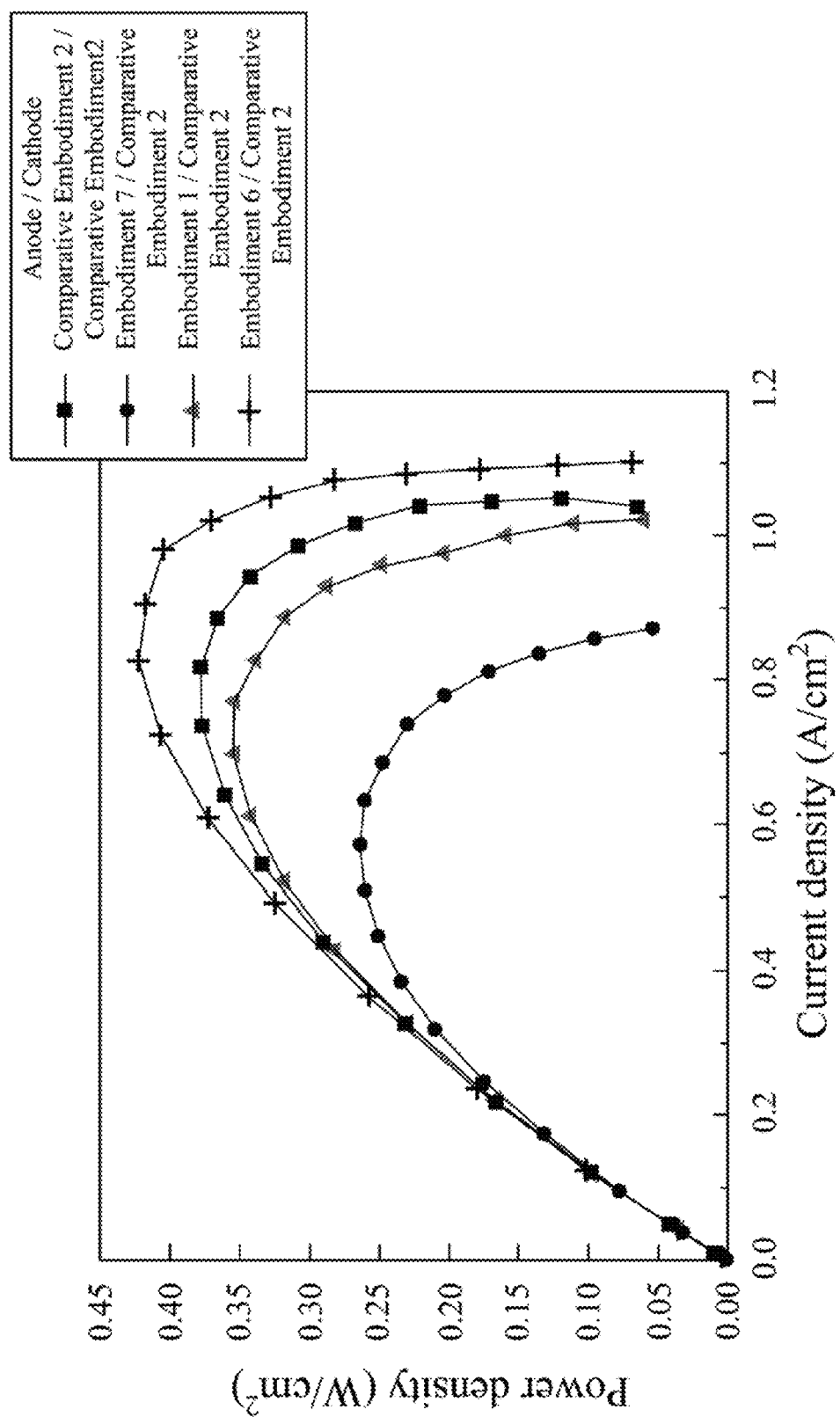
FIG. 8B shows the discharge curves of current density vs. power density corresponding to FIG. 8A.

Please refer to FIG. 8A and FIG. 8B. FIG. 8A shows discharge curves of current density vs. voltage of membrane electrode assemblies using catalyst layers in Embodiments 1, 6 and 7 and Comparative embodiment 2. FIG. 8B shows the discharge curves of current density vs. power density corresponding to FIG. 8A. In particular, FIG. 8A shows the discharge curves of the current density vs. the voltage of the membrane electrode assemblies that use the catalyst layers of Embodiments 1, 6 and 7 and Comparative embodiment 2 as the anode and the commercial catalyst of Comparative embodiment 2 as the cathode.

Based on FIG. 8A and FIG. 8B, the performance of the membrane electrode assembly is negatively proportional to the cycle number of the atomic layer deposition step for forming the platinum particles on the catalyst support when the anode of the membrane electrode assembly is the catalyst layers of Embodiments 6, 1 and 7 and Comparative embodiment 1. That is, when the cycle number is higher, the particle size of the platinum particles becomes greater, but the catalyst ability thereof becomes lower. Accordingly, the specific power density of the membrane electrode assembly is reduced.

In addition, based on the discharge curves of the current density vs. the power density shown in FIG. 8B, the performance of the membrane electrode assembly using the catalyst layer of Embodiment 6 as the anode is even higher than that of the membrane electrode assembly using two commercial catalysts of Comparative embodiment 2 as the anode and the cathode. The performance data of FIG. 8A and FIG. 8B are compared in Table 4. It is seen that the specific power density of the catalyst layer of Embodiment 6 at 0.6 V (that is, 41.444 W/mg) can be obtained by dividing the power density of the membrane electrode assembly (that is, 0.373 mW/cm$^2$) with the amount of the platinum particles on the catalyst layer of Embodiment 6 (that is, 0.009 mg/cm$^2$). Similarly, the specific power density of the commercial catalyst of Comparative embodiment 2, which is used as the cathode, at 0.6 V can be obtained according to the abovementioned method and is 0.668 W/mg.

Accordingly, it is seen that the specific power density of the catalyst layer provided in Embodiment 6 of the present disclosure, which is used as the anode of the membrane electrode assembly, is 62 times higher than that of the commercial catalyst of Comparative embodiment 2 even the loading amount of the platinum particles is lower.

TABLE 4

| Electrode | | $P_{MEA}$@0.6 V (W/cm$^2$) | Loading amount of Platinum particles (mg/cm$^2$) | | $P_{sA}$@0.6 V (W/mg) |
|---|---|---|---|---|---|
| anode | cathode | | anode | cathode | |
| Comparative embodiment 2 | Comparative embodiment 2 | 0.334 | 0.5 | 0.5 | 0.668 |
| Embodiment 6 | Comparative embodiment 2 | 0.373 | 0.009 | 0.5 | 41.444 |

Figure 9A:
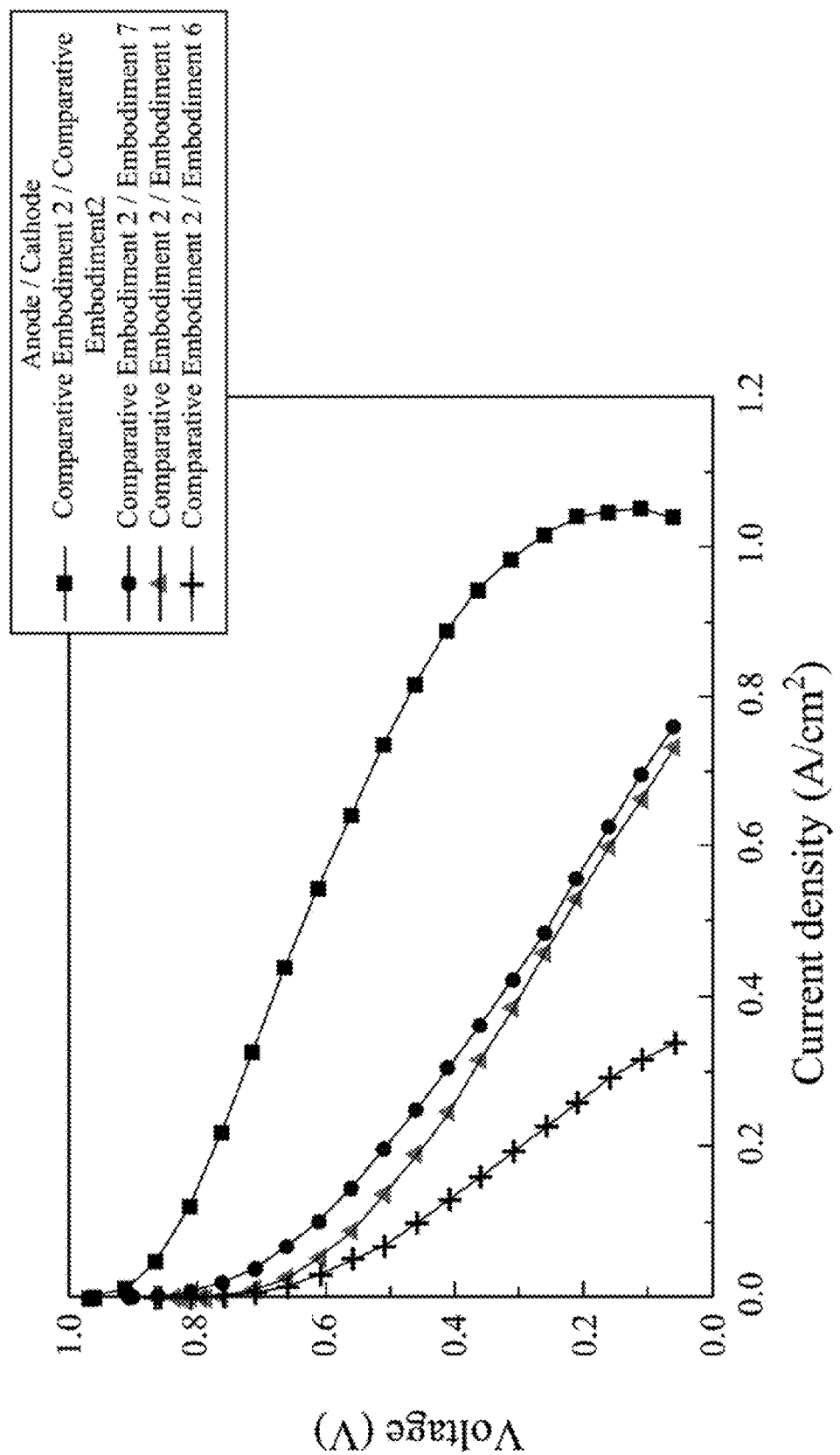
FIG. 9A shows other discharge curves of current density vs. voltage of membrane electrode assemblies using catalyst layers in Embodiments 1, 6 and 7 and Comparative embodiment 2.
Figure 9B:
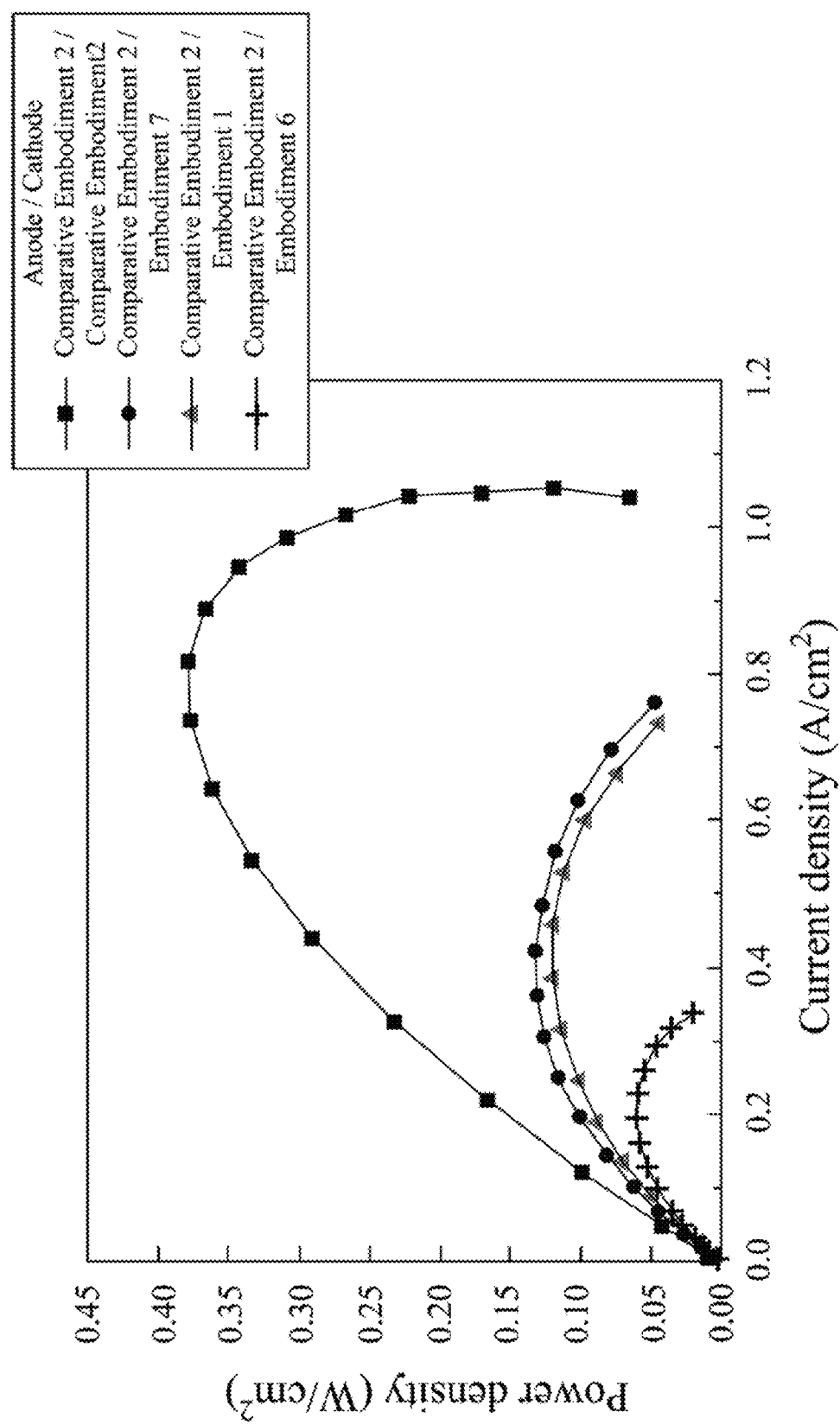
FIG. 9B shows other discharge curves of current density vs. power density corresponding to FIG. 9A.

Please refer to FIG. 9A and FIG. 9B. FIG. 9A shows other discharge curves of current density vs. voltage of membrane electrode assemblies using catalyst layers in Embodiments 1, 6 and 7 and Comparative embodiment 2. FIG. 9B shows other discharge curves of current density vs. power density corresponding to FIG. 9A. In particular, FIG. 9A shows the discharge curves of the current density vs. the voltage of the membrane electrode assemblies that use the catalyst layers of Embodiments 1, 6, and 7 and Comparative embodiment 2 as the cathode and the commercial catalyst of Comparative embodiment 2 as the anode.

Based on FIG. 9A and FIG. 9B, the performances of the membrane electrode assemblies using the catalyst layer of Embodiment 6, 1 or 7 as the cathode are obviously lower than that of the membrane electrode assembly using two commercial catalyst of Comparative embodiment 2 as the anode and the cathode. The performance data of FIG. 9A and FIG. 9B are compared in Table 5. It is seen that the specific power density of the catalyst layer of Embodiment 6 at 0.6 V is 2.000 W/mg and that of the commercial catalyst of Comparative embodiment 2, which is used as the cathode, at 0.6 V is 0.668 W/mg.

Accordingly, it is seen that the loading amount of the platinum particles of the catalyst layer provided in Embodiment 6 of the present disclosure is lower. However, the specific power density of the abovementioned catalyst layer, which is used as the cathode of the membrane electrode assembly, is close to 3 times higher than that of the commercial catalyst of Comparative embodiment 2.

TABLE 5

| Electrode | | $P_{MEA}$@0.6 V (W/cm$^2$) | Loading amount of Platinum particles (mg/cm$^2$) | | $P_{sC}$@0.6 V (W/mg) |
|---|---|---|---|---|---|
| anode | cathode | | anode | cathode | |
| Comparative embodiment 2 | Comparative embodiment 2 | 0.334 | 0.5 | 0.5 | 0.668 |
| Comparative embodiment 2 | Embodiment 6 | 0.0018 | 0.5 | 0.009 | 2.000 |

Figure 10A:
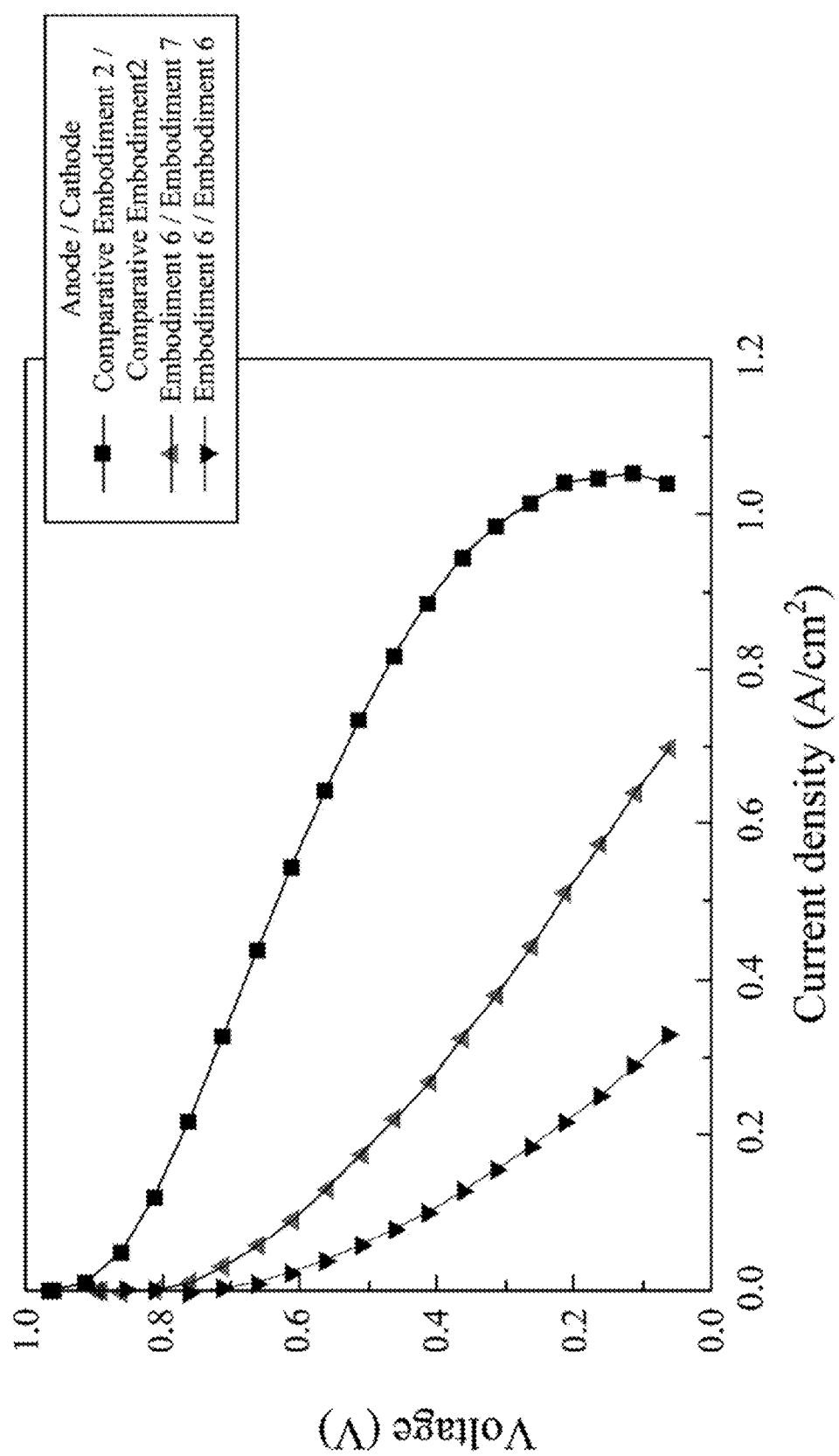
FIG. 10A shows discharge curves of current density vs. voltage of membrane electrode assemblies using catalyst layers in Embodiments 6 and 7 and in Comparative embodiment 2.
Figure 10B:
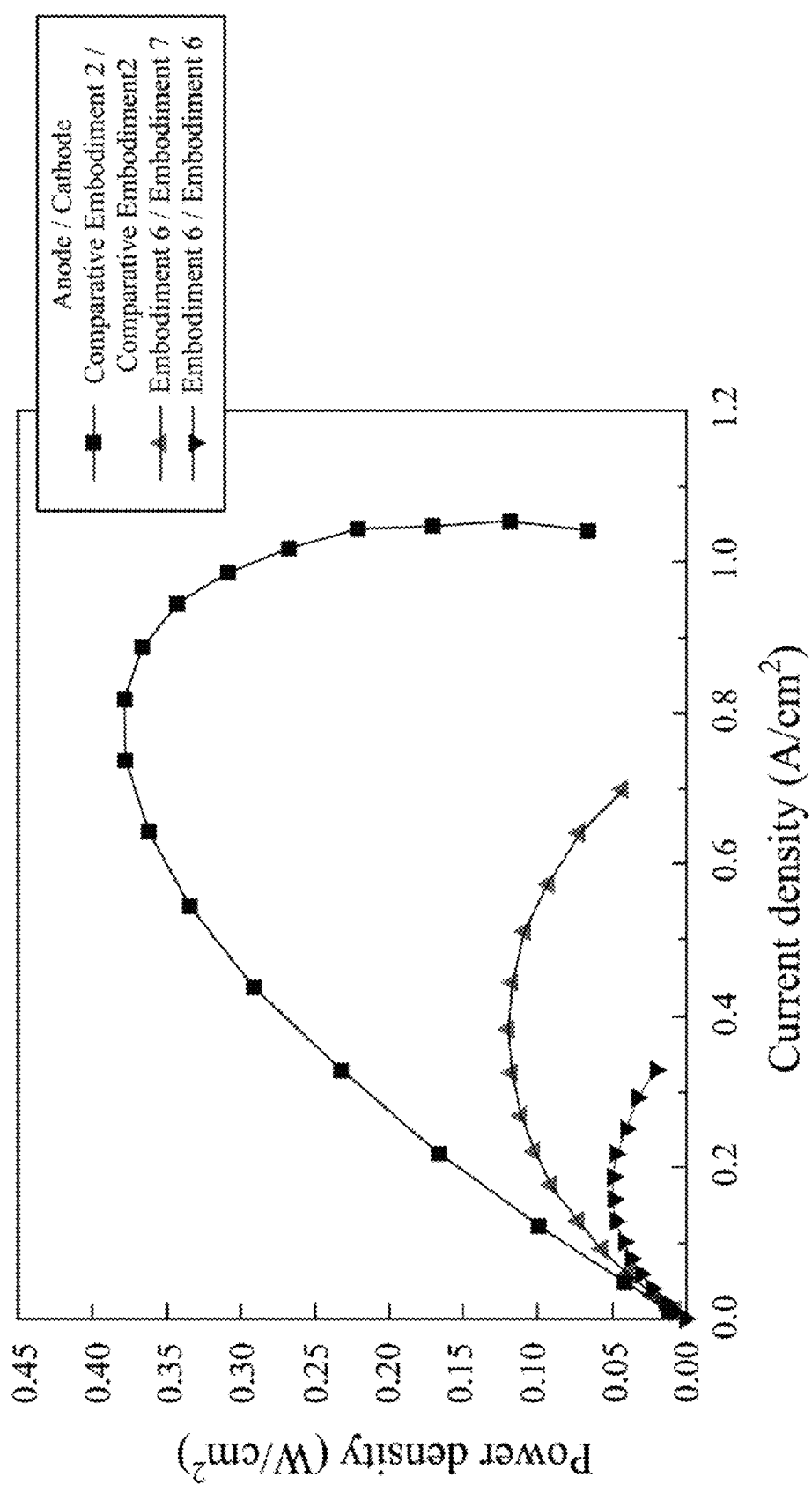
FIG. 10B shows the discharge curves of current density vs. power density corresponding to FIG. 10A.

Please refer to FIG. 10A and FIG. 10B. FIG. 10A shows discharge curves of current density vs. voltage of membrane electrode assemblies using catalyst layers in Embodiments 6 and 7 and catalyst layer in Comparative embodiment 2. FIG. 10B shows discharge curves of current density vs. power density corresponding to FIG. 10A. In particular, FIG. 10A shows the discharge curves of the current density vs. the voltage of the membrane electrode assemblies that use the catalyst layer of Embodiment 6 as the anode, and the catalyst layer of Embodiment 6 or 7 as the cathode, and the catalyst layers of Comparative embodiment 2 as both the anode and the cathode.

Based on FIG. 10A and FIG. 10B, the performances of the membrane electrode assemblies using the catalyst layer provided in the present disclosure as the anode and the cathode are lower than that of the membrane electrode assembly using the commercial catalyst of Comparative embodiment 2 as the anode and the cathode. However, it may be due to the lower loading amount of the platinum particles of the catalyst layer provided in the present disclosure. Please further refer to Table 6, it is seen that the specific power density of the membrane electrode assembly at 0.6 V is 1.188 W/mg when the anode and the cathode are the catalyst layer of Embodiment 6 and the catalyst layer of Embodiment 7, respectively. The specific power density of the membrane electrode assembly, which uses the catalyst layer of Comparative embodiment 2 as the anode and the cathode, at 0.6 V is 0.334 W/mg.

Accordingly, it is noted that the specific power density (represented by $P_{sMEA}$@0.6V in Table 6) of the membrane electrode assembly, which uses the catalyst layer of the present disclosure with a lower loading amount of the platinum particles as the anode and the cathode, is approximately 3.5 times higher than that of the commercial catalyst of Comparative embodiment 2.

TABLE 6

| Electrode | | $P_{MEA}$@0.6 V (W/cm$^2$) | Loading amount of Platinum particles (mg/cm$^2$) | | $P_{sMEA}$@0.6 V (W/mg) |
|---|---|---|---|---|---|
| anode | cathode | | anode | cathode | |
| Comparative embodiment 2 | Comparative embodiment 2 | 0.334 | 0.5 | 0.5 | 0.334 |
| Embodiment 6 | Embodiment 7 | 0.057 | 0.009 | 0.039 | 1.188 |

To sum up, the advantages provided by the method for manufacturing the catalyst layer in the present disclosure, the manufactured catalyst layer, the method for manufacturing the membrane electrode assembly using the same, the membrane electrode assembly and the fuel cell are listed as follows. First, titanium nitride (TiN) is used to replace the traditional carbon materials as the catalyst support. The catalyst support composed of titanium nitride, which is manufactured by the method provided in the present disclosure, can reduce the required thermal energy of the carbon materials (higher than 1000° C.) and has a better chemical stability. Furthermore, the CO poisoning effect can be reduced so as to improve the lifetime of the proton exchange membrane fuel cell. Therefore, expensive and precious equipment is not necessary for the manufacturing process and the catalyst support can be prepared in a simple and cheap way. In addition to the improvement of the utilization efficiency of the membrane electrode assembly, the usage of the platinum particles can be reduced efficiently. Therefore, the cost and the sale price can be reduced when the fuel cell fabricated by the present disclosure is mass produced.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure covers modifications and variations of this disclosure provided they fall within the scope of the following claims.

What is claimed is:

1. A method for manufacturing a catalyst layer, comprising:
    providing a solution fabrication step for fabricating a solution, wherein the solution comprising a solvent, a titanium-containing precursor and a polymer;
    providing a layering step for evaporating the solvent to form a gel-like layer;
    performing a nitridation step for treating the gel-like layer in ammonia ambience to remove the polymer so as to obtain a catalyst support, wherein the catalyst support is composed of titanium nitride with a plurality of pores; and
    performing a catalyst preparation step for forming a plurality of platinum particles on the catalyst support.

2. The method of claim 1, wherein the catalyst preparation step is an atomic layer deposition step or a wet chemical reduction step.

3. The method of claim 2, further comprising:
    repeating the catalyst preparation step for 50 times to 300 times when the catalyst preparation step is the atomic layer deposition step.

4. The method of claim 1, wherein the layering step is a spin coating step or a dip coating step.

5. The method of claim 1, wherein the titanium-containing precursor is titanium isopropoxide or titanium butoxide.

6. The method of claim 1, wherein the polymer is polyvinylpyrrolidone, polyethylene glycol, polyvinyl alcohol, polyethylene oxide, polyacrylic acid or poly(ethylene glycol)-poly(propylene glycol)-poly(ethylene glycol).

7. The method of claim 1, wherein the solvent is N-methyl-2-pyrrolidone or ethanol.

8. The method of claim 1, wherein in the solution the amount of the polymer with respect to the amount of the titanium-containing precursor is greater than or equal to 10 wt % and less than or equal to 50 wt %.

9. The method of claim 1, wherein the nitridation step is performed to heat the gel-like layer in the ammonia ambience at a temperature higher than or equal to 800° C. and less than or equal to 1000° C.

10. The method of claim 1, wherein the nitridation step is performed for 1 to 2 hours.

11. A catalyst layer manufactured by a method according to claim 1, comprising:
    the catalyst support with the pores, wherein a portion of the pores include a first pore size of 2 nm to 50 nm, and the other portion of the pores include a second pore size greater than 50 nm and less than or equal to 100 nm; and
    the platinum particles disposed on the catalyst support.

12. The catalyst layer of claim 11, wherein a specific surface area of the catalyst support ranges from 80 m$^2$/g to 200 m$^2$/g.

13. The catalyst layer of claim 11, wherein an average particle size of the platinum particles ranges from 2 nm to 15 nm.

14. The catalyst layer of claim 11, wherein the catalyst support has a loading amount of the platinum particles ranged from 5 μg/cm² to 100 μg/cm².

15. The catalyst layer of claim 11, wherein a specific power density of the catalyst layer at 0.6V ranges from 0.8 W/mg to 1.2 W/mg.

16. A method for manufacturing a membrane electrode assembly, comprising:
providing a proton exchange membrane with a first surface and a second surface;
providing an anodic gas diffusion layer and a cathodic gas diffusion layer;
providing an anodic catalyst layer and a cathodic catalyst layer;
wherein the anodic catalyst layer is disposed on the anodic gas diffusion layer and located between the first surface of the proton exchange membrane and the anodic gas diffusion layer, and the cathodic catalyst layer is disposed on the cathodic gas diffusion layer and located between the second surface of the proton exchange membrane and the cathodic gas diffusion layer;
wherein at least one of the anodic catalyst layer and the cathodic catalyst layer is manufactured by a method according to claim 1; and
providing a hot pressing step, wherein the anodic gas diffusion layer, the anodic catalyst layer, the proton exchange membrane, the cathodic catalyst layer and the cathodic gas diffusion layer are hot pressed to form the membrane electrode assembly.

17. The method for manufacturing the membrane electrode assembly of claim 16, wherein each of the anodic gas diffusion layer and the cathodic gas diffusion layer is a carbon paper.

18. A membrane electrode assembly manufactured by a method according to claim 16.

19. A fuel cell, comprising:
at least one membrane electrode assembly according to claim 18.

20. The fuel cell of claim 19, wherein the fuel cell is a proton exchange membrane fuel cell.

* * * * *